(12) United States Patent
Densel et al.

(10) Patent No.: US 7,434,847 B2
(45) Date of Patent: Oct. 14, 2008

(54) QUICK CONNECT TUBE COUPLING

(75) Inventors: David S. Densel, Whitehouse, OH (US);
Steven D. Haubert, Sylvania, OH (US);
Darwin C. Olson, Perrysburg, OH (US);
Philip C. Van Riper, Holland, OH (US)

(73) Assignee: Eaton Corporation, Cleveland, OH (US)

( * ) Notice: Subject to any disclaimer, the term of this patent is extended or adjusted under 35 U.S.C. 154(b) by 158 days.

(21) Appl. No.: 11/003,093

(22) Filed: Dec. 3, 2004

(65) Prior Publication Data
US 2005/0121908 A1 Jun. 9, 2005

Related U.S. Application Data

(60) Provisional application No. 60/526,852, filed on Dec. 4, 2003.

(51) Int. Cl.
*F16L 21/06* (2006.01)
(52) U.S. Cl. .................. 285/322; 285/331; 285/374
(58) Field of Classification Search ............. 285/322, 285/331, 374, 243
See application file for complete search history.

(56) References Cited

U.S. PATENT DOCUMENTS

| | | | | |
|---|---|---|---|---|
| 4,282,175 A | | 8/1981 | Volgstadt et al. | |
| 4,407,526 A | * | 10/1983 | Cicenas | 285/27 |
| 4,445,714 A | * | 5/1984 | Kisiel, III | 285/23 |
| 5,468,028 A | * | 11/1995 | Olson | 285/322 |
| 5,673,945 A | | 10/1997 | Olson | |
| 5,681,061 A | * | 10/1997 | Olson | 285/322 |
| 6,142,538 A | | 11/2000 | Volgstadt et al. | |
| 6,224,117 B1 | * | 5/2001 | Olson et al. | 285/322 |
| 6,869,109 B2 | * | 3/2005 | Matsushita | 285/308 |

FOREIGN PATENT DOCUMENTS

FR         2665508        2/1992

* cited by examiner

*Primary Examiner*—David E Bochna
(74) *Attorney, Agent, or Firm*—Benesch, Friedlander Coplan & Aronoff LLP

(57) ABSTRACT

A quick-connect coupling having a tubular tube support, a sleeve and a collet. The tubular tube support includes a tube support portion and a mounting flange joined to the tube support portion. The sleeve includes an inner surface diameter greater than an outer surface diameter of the tube and an outer surface engaging an inner wall of a bore. The collet includes an outer surface engaging the inner surface of the sleeve and an inner surface diameter greater than an outer surface diameter of the tubular tube support and slightly less than the outer surface diameter of the tube. The tube is frictionally retained between the collet and the tubular tube support when the tube is inserted into the coupling.

15 Claims, 6 Drawing Sheets

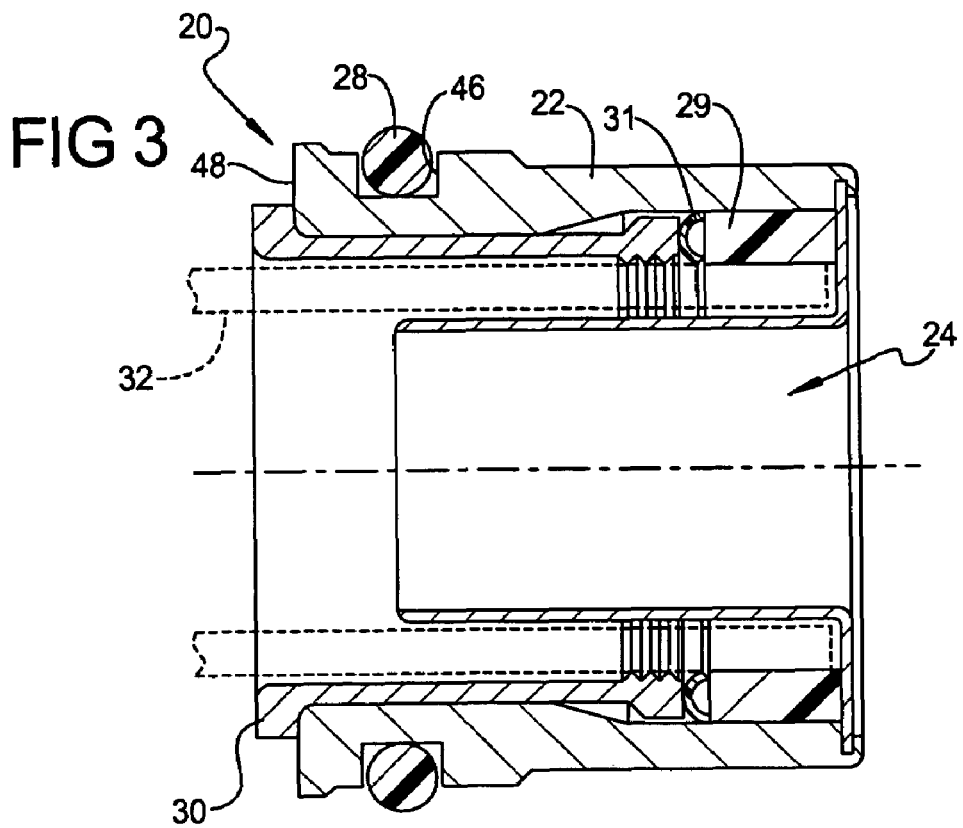
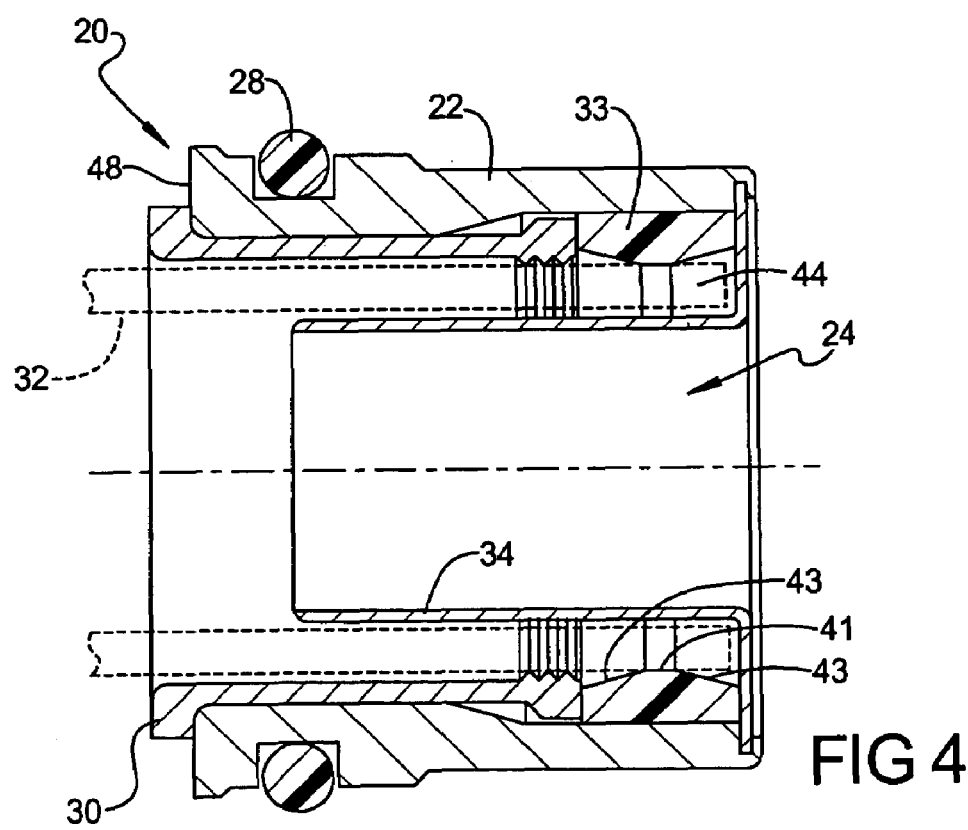

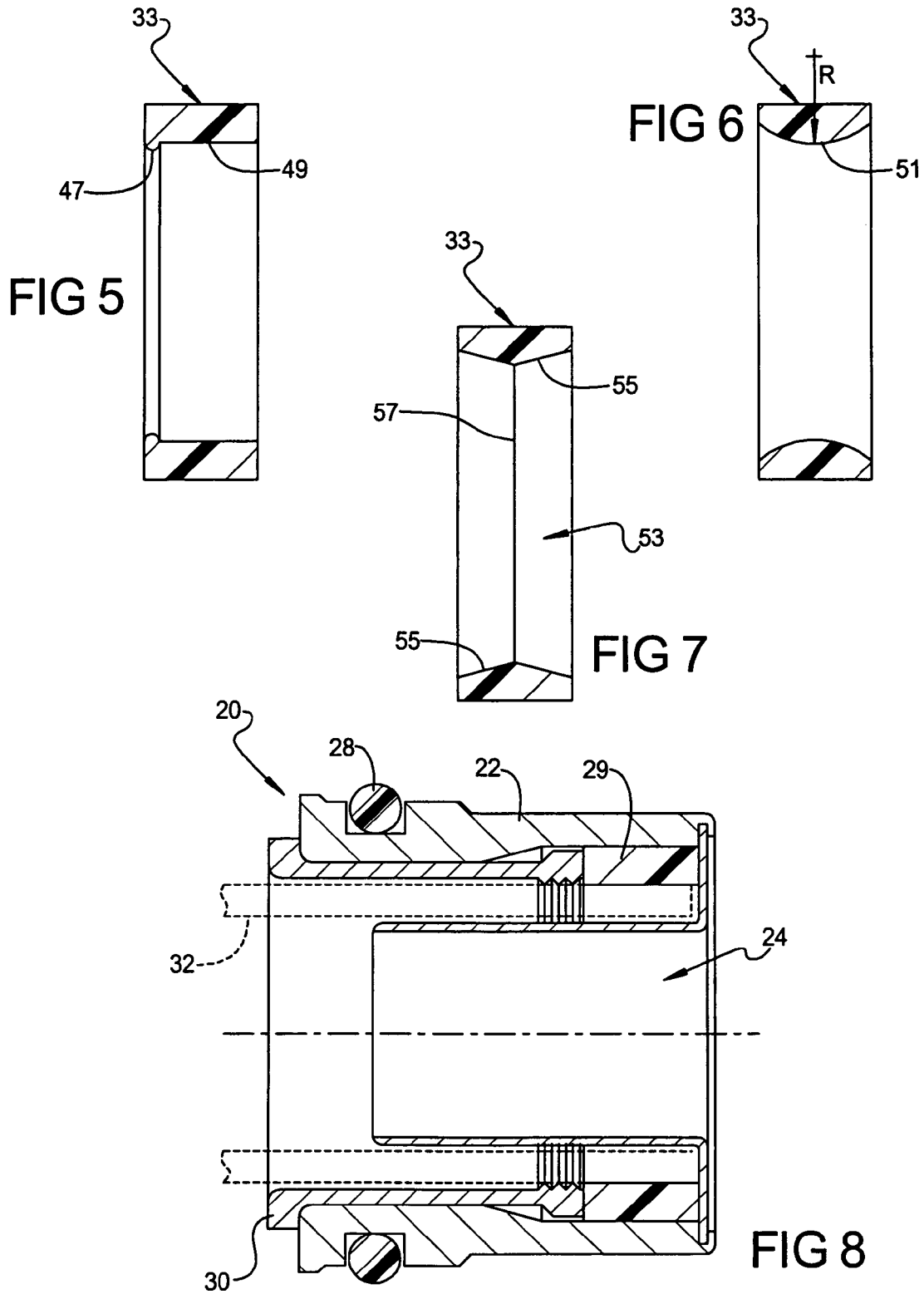

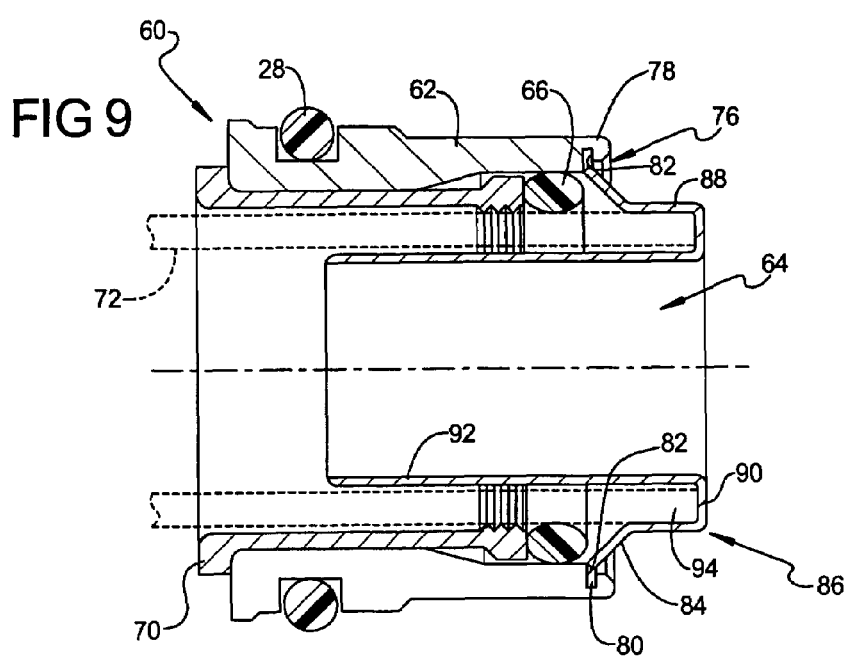
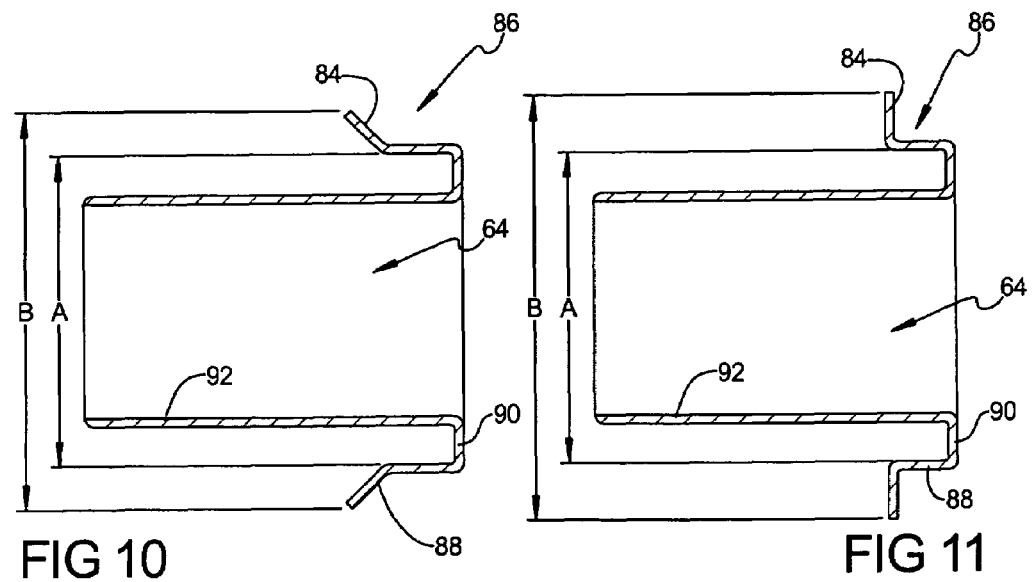

QUICK CONNECT TUBE COUPLING

CROSS REFERENCE TO RELATED APPLICATIONS

This application claims priority to U.S. provisional application No. 60/526,852, filed on Dec. 4, 2003, which is incorporated herein by reference in its entirety.

BACKGROUND OF THE INVENTION

1. Field of the Invention

The present invention relates to quick connect tube couplings, and more particularly to improvements in configurations for such couplings.

2. Description of the Related Art

Quick-connect tube couplings are used to connect flexible tubes in fluid power systems such as, for example, pressured air systems for vehicle air brakes and air conditioning systems, which may involve connections to diverse items such as valve bodies, air tanks and the like. In these and other systems, each flexible tube requires a coupling to connect the end of the tube to a body, such as a conventional fitting, valve, manifold or similar device for transmitting and receiving pressurized fluid. Connecting a tube to a body, or removing a tube from a body, can be a time consuming and expensive task that is frequently performed in the field where specialized tubes may not be readily available.

There are a variety of "push-to-connect" type couplings that permit a tube to be quickly and easily connected to a valve or manifold body without the use of tools. With these couplings, a tube is connected by simply press-fitting the coupling into a bore within the body and then inserting the leading end of the tube into the coupling. Typically, the coupling contains a plurality of components that releasably retain the tube therein.

One known quick-connect coupling design includes a sleeve with a tube support mounted therein, an internal O-ring, an external O-ring and a collet that cooperatively retain the tube on the tube support by engaging the tube with the collet. While this design has proven effective in practice, coupling designers continue to develop improvements in these types of couplings to further minimize manufacturing expense, reduce assembly errors and expedite assembly of the components prior to insertion into a fitting or manifold body.

SUMMARY OF THE INVENTION

A quick-connect coupling is provided that includes a tubular tube support, a sleeve and a collet. In an embodiment of the invention, the tube support includes an outside surface configured to frictionally engage an inner wall of a tube, a tube support portion and a mounting flange joined to the tube support portion. The sleeve includes an inner surface diameter greater than an outer surface diameter of the tube and an outer surface engaging a wall of a bore. The collet includes an outer surface engaging the inner surface of the sleeve and an inner surface diameter greater than an outer surface diameter of the tubular tube support and slightly less than the outer surface diameter of the tube. The tube is frictionally retained between the collet and the tubular tube support when inserted into the coupling. At least one annular sealing member is axially disposed between the tubular tube support and the end of the collet for sealing with the tube, and at least one spacer-member is disposed between the radially extending mounting flange and the annular sealing member. The annular sealing member and spacer member are positioned to form an annular trough between the collet and the tube support portion for receiving the end of the tube. The radially extending mounting flange is fixed to the first end of the sleeve to assemble the components.

In another embodiment of the invention, the quick-connect coupling includes an annular sealing member having a generally rectangular cross-section, which is disposed between the radially extending mounting flange and the end of the collet. The annular sealing member is positioned to form an annular trough between the collet and the tube support portion for receiving the end of the tube.

In another embodiment of the invention, a quick-connect coupling is provided that includes a tubular tube support, a sleeve and a collet. The tubular tube support includes an outside surface configured to frictionally engage an inner wall of a tube. The sleeve includes an inner surface diameter greater than an outer surface diameter of the tube and an outer surface engaging the surface of a bore. The collet includes an outer surface engaging the inner surface of the sleeve and an inner surface diameter greater than an outer surface diameter of the tubular tube support and slightly less than the outer surface diameter of the tube. The tube is frictionally retained between the collet and the tubular tube support. An annular sealing member is disposed between the sleeve and the tube support, and is positioned to sealingly contact an inner surface of the bore and the outer surface of the tube.

A method of manufacturing a quick connect coupling is also provided.

BRIEF DESCRIPTION OF THE DRAWINGS

Embodiments of the invention will now be described, by way of example, with reference to the accompanying drawings, wherein:

FIG. 3 is a cross-sectional view illustrating a push-to-connect coupling according to another embodiment of the present invention;

FIG. 4 is a cross-sectional view illustrating a push-to-connect coupling according to another embodiment of the present invention;

FIG. 5 is a cross-sectional view of another embodiment of an annular sealing member for use in the coupling of FIG. 4;

FIG. 6 is a cross-sectional view of another embodiment of an annular sealing member for use in the coupling of FIG. 4;

FIG. 7 is a cross-sectional view of another embodiment of an annular sealing member for use in the coupling of FIG. 4;

FIG. 8 is a cross-sectional view illustrating a push-to-connect coupling according to another embodiment of the present invention;

FIG. 9 is a cross-sectional view illustrating a push-to-connect coupling according to another embodiment of the present invention;

FIG. 10 is a cross-sectional view of a tube support shown in FIG. 9, prior to attachment of the tube support to the coupling;

FIG. 11 is a cross-sectional view of a tube support shown in FIG. 9, after attachment of the tube support to the coupling;

DETAILED DESCRIPTION

Figure 1:
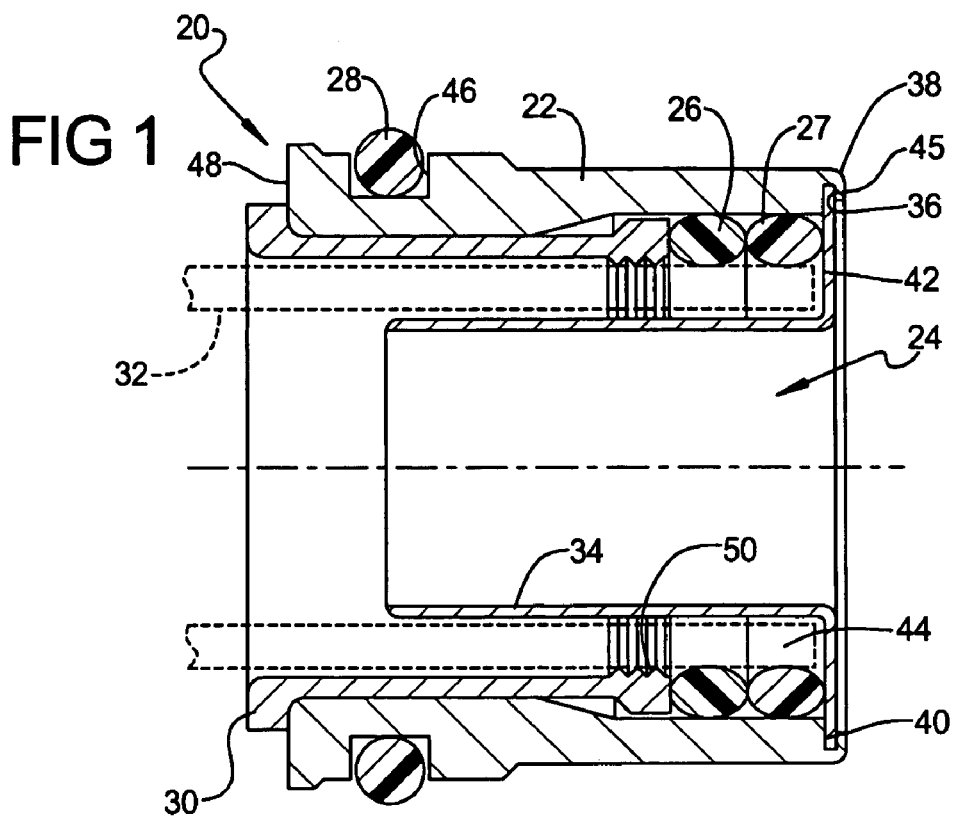
FIG. 1 is a cross-sectional view illustrating a push-to-connect coupling according to an embodiment of the present invention.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Referring now to FIG. 1, there is shown an embodiment of a quick-connect tube coupling 20, configured in accordance with the principles of the present invention. In the illustrated embodiment, quick-connect tube coupling 20 includes a sleeve 22, a tube support 24, a pair of internal O-rings 26 and 27, an external O-ring 28 and a collet 30. A flexible tube 32 is received over a tube support portion 34 of tube support 24 and is frictionally retained thereon when collet 30 is slid over tube 32.

In an embodiment, sleeve 22 has a relieved annular end portion 36 at a first end 38 thereof, which defines an annular shoulder 40. The annular shoulder 40 supports a radially extending flange 42 of tube support 24. The radial flange 42 is substantially perpendicular to tube support portion 34 of tube support 24. Unlike prior art couplings, tube support 24 does not include an L-shaped connecting portion between flange 42 and tube support portion 34. Between internal O-rings 26, 27 and first portion 34 of tube support 24 is an annular void 44 that receives the end of tube 32. In the embodiment shown in FIG. 1, tube support 24 is retained within sleeve 22 with a roll/coin edge 45 that engages the end of radial flange 42.

Internal O-ring 26 is positioned to seal against tube 32 and internal O-ring 27 rests against radial flange 42 of tube support 24. Internal O-ring 27 functions as a spacer between internal O-ring 26 and radial flange 42; however, internal O-ring 27 may also seal against tube 32. External O-ring 28 is received in an annular external groove 46 in sleeve 12 proximate a second end 48 of sleeve 22 and seals against an inner wall of a bore into which coupling 20 installed.

Collet 30 includes an internal gripping surface 50, which may include at least one barb or other formation used to frictionally engage tube 32. Collet 30 slides into sleeve 22 to secure tube 32 against tube support portion 34 of tube support 24.

Figure 2:
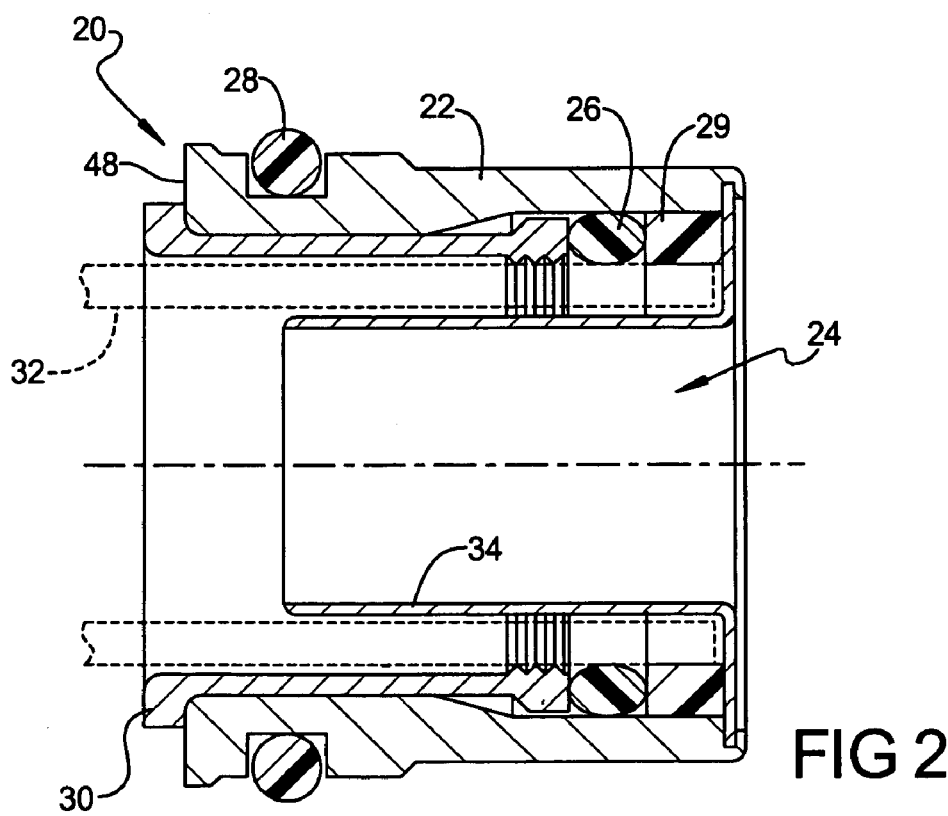
FIG. 2 is a cross-sectional view illustrating a push-to-connect coupling according to another embodiment of the present invention.

The assembly sequence of the coupling embodiment shown in FIG. 1 is as follows. Collet 30 is inserted into sleeve 22 after insertion of internal O-rings 26, 27. Tube support 24 is then installed and staked to sleeve 22 by virtue of roll/coin edge 45. Finally, external O-ring 28 is inserted into external groove 46 on sleeve 22. The component parts of coupling 20 remain together after assembly and do not require a plug to keep the component parts assembled Referring to FIGS. 2 and 3, another embodiment of coupling 20 is shown. In the embodiment shown in FIG. 2, internal O-ring 27 is replaced with a spacer insert 29. Spacer insert 29 is shown as having a generally rectangular cross-section; however, other geometric cross-sectional shapes, such as an oval, are also within the scope of the invention. Spacer 29 may be made of ferrous and non-ferrous metals, plastic, elastomers and may or may not exhibit sealing properties. In the embodiment shown in FIG. 3, internal O-ring 26 is also replaced with a flexible cup seal 31, such as a C-cup seal, or other non-O-ring type annular sealing member.

With reference to FIG. 4, another embodiment of coupling 20 is shown. In this embodiment, both internal O-rings 26, 27 are replaced with an annular sealing member 33. Annular sealing member 33 functions as both a sealing element to seal against tube 32 and as a support element to support tube 32 within void 44. In the embodiment shown in FIG. 4, annular sealing member 33 includes an inner surface having a generally flat interior cylindrical component 41 and a pair or tapered components 43 that extend radially outwardly and away from cylindrical component 41.

In another embodiment shown in FIG. 5, annular sealing member 33 is generally rectangular in cross-section and includes a sealing protrusion 47, such as an annular dimple, which extends inwardly from an inner surface 49. In another embodiment shown in FIG. 6, annular sealing member 33 includes a generally rounded inner surface 51 defined by at least one radius R. In still another embodiment shown in FIG. 7, an inner surface 53 of annular sealing member 33 is defined by two tapered surface components 55 that converge at an apex 57. Apex 57 may be defined by a point, as in FIG. 7, or even a flat or radius, for example. It will, however, be appreciated that annular sealing member 33 is not limited to the embodiments shown in FIGS. 4-7 and that other cross-sectional profiles are within the scope of the invention.

Annular sealing member 33 may be molded from a polymeric material, such as a thermoset elastomer. Alternatively, annular sealing member 33 may be cut from a blank of polymeric material. For example, FIG. 8 illustrates a generally rectangular annular sealing member 29 whose shape is cut using a lathe or other cutting apparatus, rather than forming the shape in a mold. However, the ultimate profile achieved by cutting a polymeric blank is not intended to be limited to the generally rectangular shape profile shown in FIG. 8 and may include the profiles illustrated in FIGS. 4-7, among others.

Referring now to FIGS. 9-13, there is shown another embodiment of a quick-connect coupling 60 configured in accordance with the principles of the present invention. The quick-connect coupling 60 includes a sleeve 62, a unitary tubular tube support 64, an internal O-ring 66, an external O-ring 68 and a collet 70. As with the embodiment shown in FIG. 1, the quick-connect coupling 60 is used to connect a tube 72 to another component, such as a single step bore, air tank or other bore.

As shown in FIG. 9, sleeve 62 has a relieved annular end portion 76 at a first end 78 thereof that defines a radially outwardly directed annular groove 80 and a shoulder 82. In an embodiment, tube support 64 includes a generally conical flange 84 in a pre-installed condition. Conical flange 84 is connected to the tubular tube support 64 by a radial flange portion 86 that includes an axially extending section 88 and a radially extending section 90. Between the axially extending section 88 and a tube engaging section 92 of the tube support 64 is an annular trough 94 that receives the end of tube 72.

Figure 12:
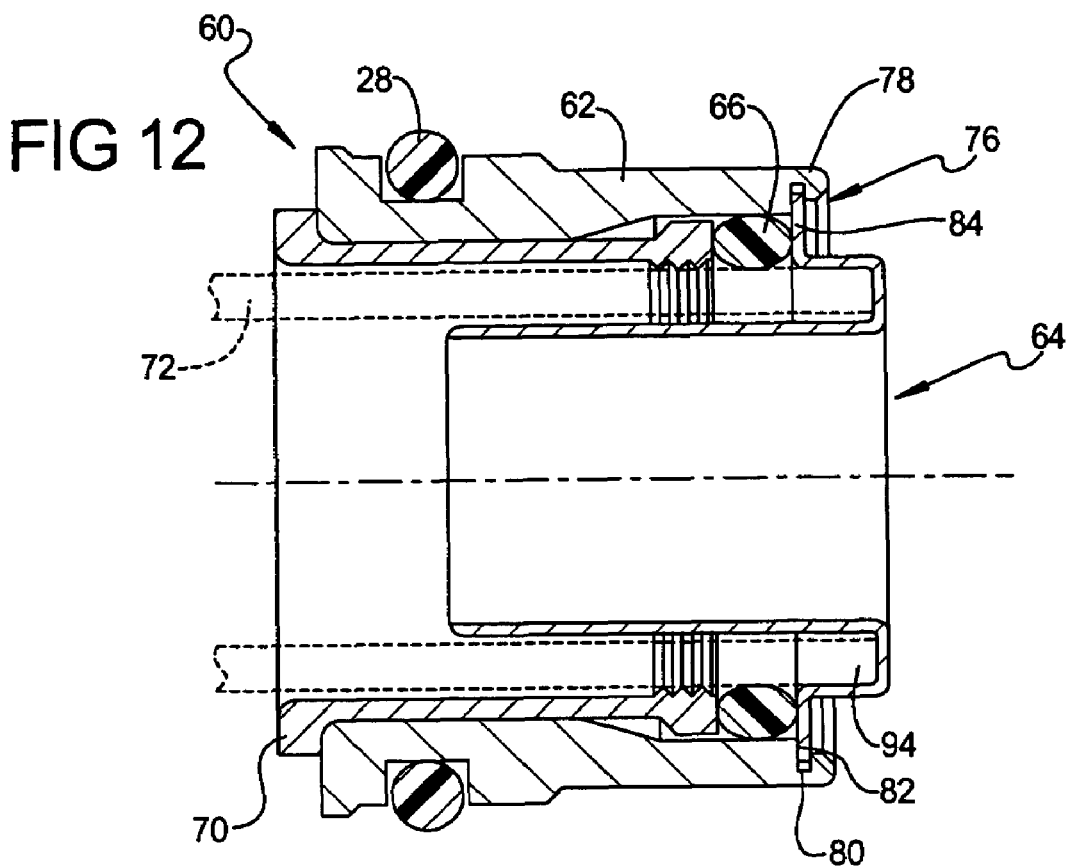
FIG. 12 is a cross-sectional view of the coupling of FIG. 9 after attachment of the tube support.
Figure 13:
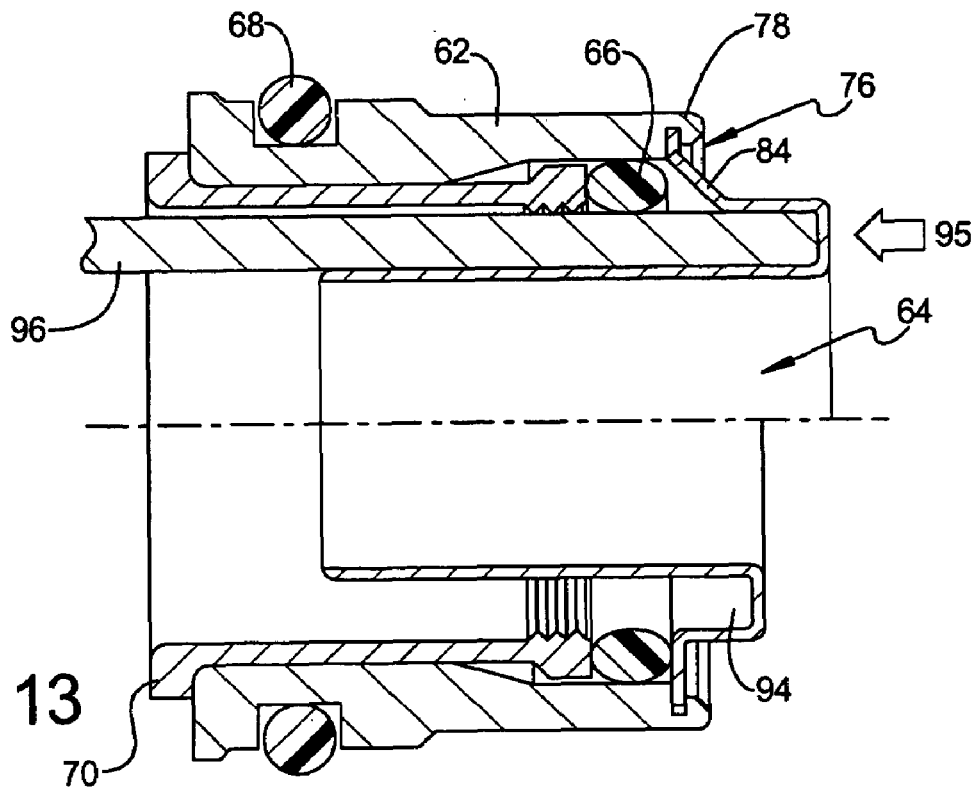
FIG. 13 is a split cross-sectional view of the coupling of FIG. 13 during and after attachment of the tube support.

As shown in FIGS. 12 and 13, tube support 64 is retained in sleeve 62 by expanding flange 84 into annular groove 80. Shoulder 82 prevents tube support 64 from progressing too far into sleeve 62 during expansion and functions as a surface against which flange 84 is deformed. As shown in FIG. 13, a force is applied to tube support 64 in the direction indicated by force vector 95. Referring to FIG. 10, as the force is applied, the dimension A, generally representing the inside diameter of flange 84, decreases to A' and the dimension B, generally representing the outside diameter of flange 84, increases to B' as flange 84 is deformed against shoulder 82 and flattens. Accordingly, as flange 84 flattens, the outside diameter of flange 84 expands into groove 80 to secure tube support 64 to sleeve 62. Optionally, a mandrel 96 may be employed during deformation of flange 84 to minimize reduction of the inside diameter of flange 84 (see, e.g. FIG. 13), ensuring tube 72 can enter trough 94 during assembly.

Figure 14:
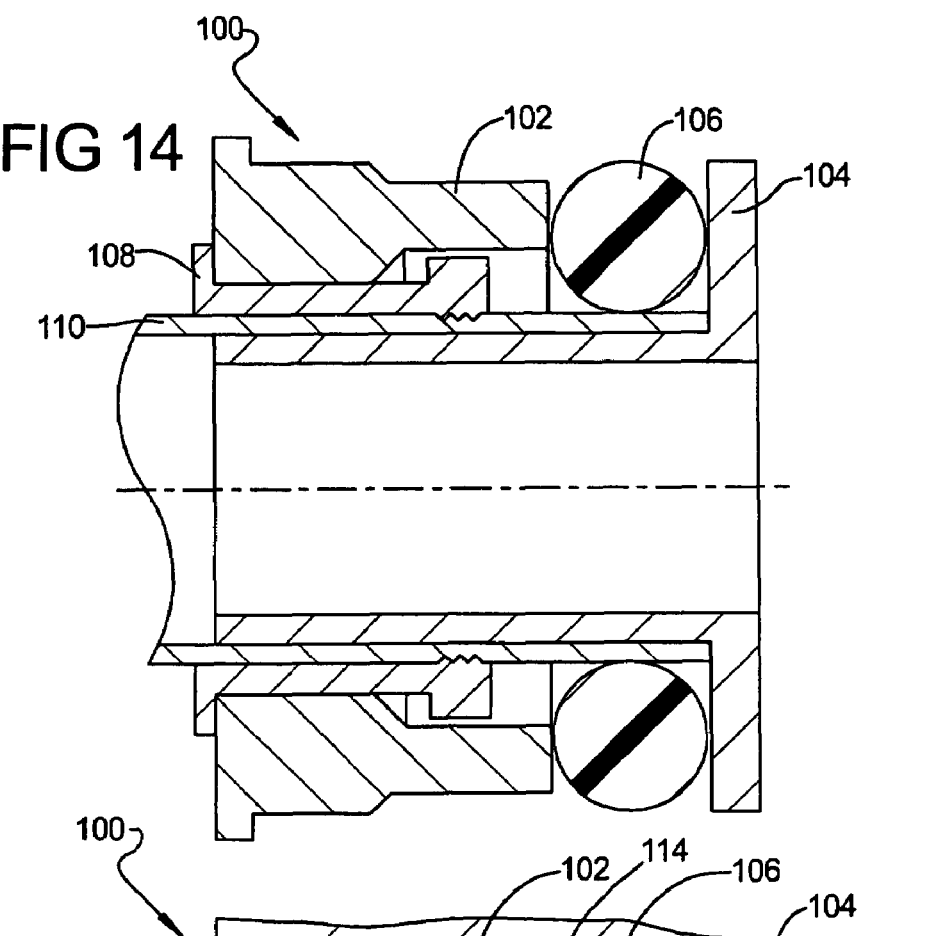
FIG. 14 is a cross-sectional view illustrating a push-to-connect coupling according to another embodiment of the present invention.
Figure 15:
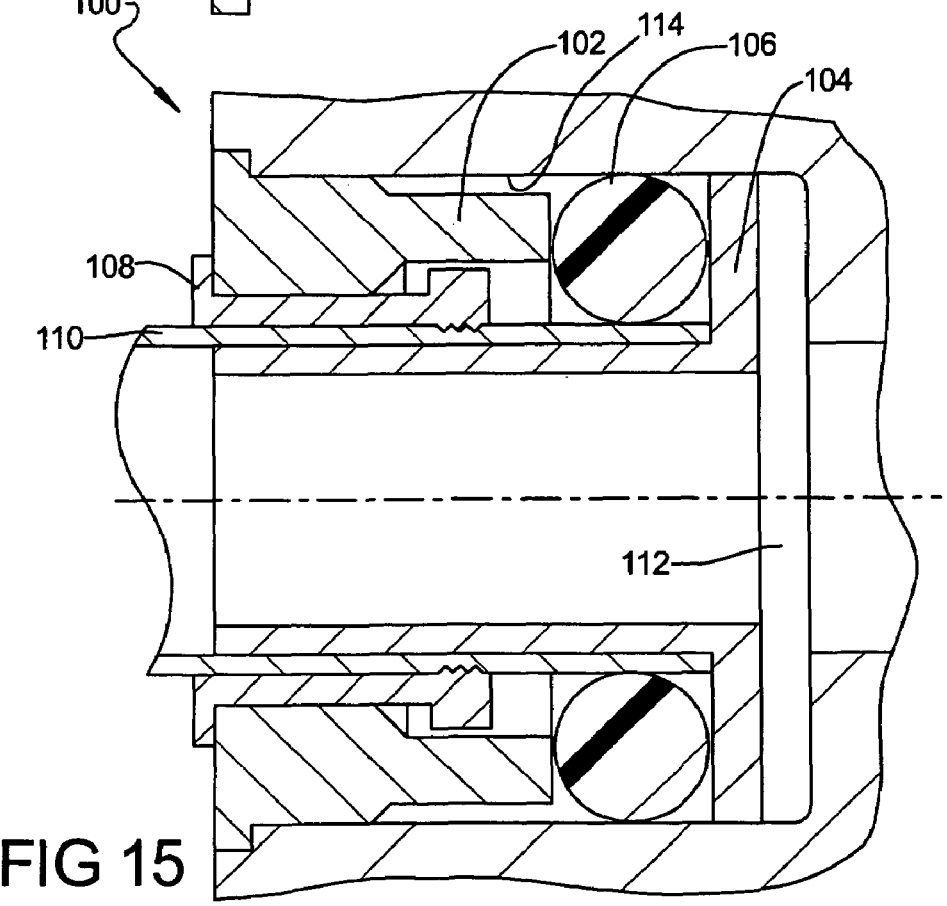
FIG. 15 is a cross-sectional view of the coupling of FIG. 14 shown installed in the bore of a valve body.

Referring now to FIGS. 14 and 15, there is shown a quick-connect coupling 100 according to another embodiment of the present invention. The quick-connect coupling 100 includes a sleeve 102, a tubular tube support 104, an O-ring 106 and a collet 108. As with the embodiment shown in FIG. 1, the quick-connect coupling 100 is used to connect a tube 110 to another component, such as a single step bore, air tank or other bore.

Referring to FIG. 15, coupling 100 is shown installed in a bore 112. When installed in bore 112, O-ring 116 seals against tube 110 and an inner cylindrical surface 114 of bore 112. In contrast to the embodiment shown in FIG. 1, coupling 100 eliminates the need for separate O-rings to seal against inner surface 114 and tube 110.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A quick-connect coupling for connecting a tube within a bore formed in a body where the bore is defined by an inner wall, the quick-connect coupling comprising:
   a tubular tube support having an outside surface suitable for frictionally engaging an inner wall of the tube;
   a sleeve having an inner surface diameter greater than an outer surface diameter of the tube and an outer surface engaging the inner wall of the bore;
   a collet having an outer surface engaging the inner surface of the sleeve and an inner surface diameter greater than an outer surface diameter of the tubular tube support and slightly less than the outer surface diameter of the tube, wherein the tube is frictionally retained between the collet and the tubular tube support; and
   an annular sealing member axially disposed between the sleeve and the tube support and positioned to sealingly contact the inner wall of the bore and the outer surface of the tube.

2. A quick-connect coupling for connecting a tube within a bore formed in a body where the bore is defined by an inner wall, the quick-connect coupling comprising:
   a sleeve having an inner surface diameter greater than an outer surface diameter of the tube and an outer surface engaging the inner wall of the bore;
   a tubular tube support having an outside surface configured to frictionally engage the inner wall of the tube, the tubular tube support further including a tube support portion and a mounting flange that extends radially outward from the tube support portion and that engages an end portion of the sleeve in a fixed relationship thereto, wherein the tubular tube support lacks an L-shaped connecting portion between the tube support portion and the radially extending mounting flange that engages the end portion of the sleeve;
   a collet having an outer surface engaging the inner surface of the sleeve and an inner surface diameter greater than an outer surface diameter of the tubular tube support and slightly less than the outer surface diameter of the tube, wherein the tube is frictionally retained between the collet and the tubular tube support;
   at least one annular sealing member axially disposed between the radially extending mounting flange of the tubular tube support and the end of the collet for sealing with the tube; and
   at least one spacer-member axially disposed between the radially extending mounting flange of the tubular tube support and the annular sealing member,
   wherein the annular sealing member and spacer member are positioned to form an annular trough between the collet and the tube support portion for receiving the end of the tube,
   wherein the annular sealing member is a cup-seal.

3. The quick-connect coupling of claim 2, wherein the spacer-member is an O-ring.

4. The quick-connect coupling of claim 2, wherein the spacer-member seals against the tube.

5. The quick-connect coupling of claim 2, wherein the spacer-member is generally rectangular in cross-section.

6. A quick-connect coupling for connecting a tube within a bore formed in a body where the bore is defined by an inner wall, the quick-connect coupling comprising:
   a sleeve having an inner surface diameter greater than an outer surface diameter of the tube and an outer surface engaging the inner wall of the bore;
   a tubular tube support having an outside surface configured to frictionally engage the inner wall of the tube, the tubular tube support further including a tube support portion and a mounting flange that extends radially outward from the tube support portion and that engages an end portion of the sleeve in a fixed relationship thereto, wherein the tubular tube support lacks an L-shaped connecting portion between the tube support portion and the radially extending mounting flange that engages the end portion of the sleeve;
   a collet having an outer surface engaging the inner surface of the sleeve and an inner surface diameter greater than an outer surface diameter of the tubular tube support and slightly less than the outer surface diameter of the tube, wherein the tube is frictionally retained between the collet and the tubular tube support;
   at least one annular sealing member axially disposed between the radially extending mounting flange of the tubular tube support and the end of the collet for sealing with the tube; and
   at least one spacer-member axially disposed between the radially extending mounting flange of the tubular tube support and the annular sealing member,
   wherein the annular sealing member and spacer member are positioned to form an annular trough between the collet and the tube support portion for receiving the end of the tube,
   wherein the end portion of the sleeve includes a roll/coin edge to retain the mounting flange of the tubular tube support.

7. The quick-connect coupling of claim 6, wherein the annular sealing member is housed within the sleeve.

8. The quick-connect coupling of claim 6, wherein the spacer-member is housed within the sleeve.

9. The quick-connect coupling of claim 6, further comprising another annular sealing member positioned in a groove in the outer surface of the sleeve and configured to sealingly engage the inner wall of the bore.

10. A quick-connect coupling for connecting a tube within a bore formed in a body where the bore is defined by an inner wall, the quick-connect coupling comprising:
   a sleeve having an inner surface diameter greater than an outer surface diameter of the tube and an outer surface engaging the inner wall of the bore;
   a tubular tube support having an outside surface configured to frictionally engage the inner wall of the tube, the tubular tube support further including a tube support portion and a mounting flange that extends radially outward from the tube support portion and that engages an end portion of the sleeve in a fixed relationship thereto, wherein the tubular tube support lacks an L-shaped connecting portion between the tube support portion and the radially extending mounting flange that engages the end portion of the sleeve;
   a collet having an outer surface engaging the inner surface of the sleeve and an inner surface greater than an outer surface diameter of the tubular tube support and slightly less than the outer surface diameter of the tube, wherein the tube is frictionally retained between the collet and the tubular tube support; and
   an annular sealing member axially disposed between the radially extending mounting flange of the tubular tube support and the end of the collet, wherein the annular sealing member has a generally rectangular cross-section with a longer axial length than radial width,
   wherein the annular sealing member is positioned to form an annular trough between the collet and the tube support portion for receiving the end of the tube,
   wherein the annular sealing member includes an inner surface having a generally flat interior cylindrical component and a pair of tapered components that extend radially outwardly away from the cylindrical component.

11. A quick-connect coupling for connecting a tube within a bore formed in a body where the bore is defined by an inner wall, the quick-connect coupling comprising:
   a sleeve having an inner surface diameter greater than an outer surface diameter of the tube and an outer surface engaging the inner wall of the bore;
   a tubular tube support having an outside surface configured to frictionally engage the inner wall of the tube, the tubular tube support further including a tube support portion and a mounting flange that extends radially outward from the tube support portion and that engages an end portion of the sleeve in a fixed relationship thereto, wherein the tubular tube support lacks an L-shaped connecting portion between the tube support portion and the radially extending mounting flange that engages the end portion of the sleeve;
   a collet having an outer surface engaging the inner surface of the sleeve and an inner surface greater than an outer surface diameter of the tubular tube support and slightly less than the outer surface diameter of the tube, wherein the tube is frictionally retained between the collet and the tubular tube support; and
   an annular sealing member axially disposed between the radially extending mounting flange of the tubular tube support and the end of the collet, wherein the annular sealing member has a generally rectangular cross-section with a longer axial length than radial width,
   wherein the annular sealing member is positioned to form an annular trough between the collet and the tube support portion for receiving the end of the tube,
   wherein the annular sealing member includes a pair of tapered surface components that converge at an apex.

12. The quick-connect coupling of claim 11, wherein the apex is defined by a point, a flat or radius.

13. A quick-connect coupling for connecting a tube within a bore formed in a body where the bore is defined by an inner wall, the quick-connect coupling comprising:
   a sleeve having an inner surface diameter greater than an outer surface diameter of the tube and an outer surface engaging the inner wall of the bore;
   a tubular tube support having an outside surface configured to frictionally engage the inner wall of the tube, the tubular tube support further including a tube support portion and a mounting flange that extends radially outward from the tube support portion and that engages an end portion of the sleeve in a fixed relationship thereto, wherein the tubular tube support lacks an L-shaped connecting portion between the tube support portion and the radially extending mounting flange that engages the end portion of the sleeve;
   a collet having an outer surface engaging the inner surface of the sleeve and an inner surface greater than an outer surface diameter of the tubular tube support and slightly less than the outer surface diameter of the tube, wherein the tube is frictionally retained between the collet and the tubular tube support; and
   an annular sealing member axially disposed between the radially extending mounting flange of the tubular tube support and the end of the collet, wherein the annular sealing member has a generally rectangular cross-section with a longer axial length than radial width;
   wherein the annular sealing member is positioned to form an annular trough between the collet and the tube support portion for receiving the end of the tube,
   wherein the end portion of the sleeve includes a roll/coin edge to retain the mounting flange of the tubular tube support.

14. The quick-connect coupling of claim 13, wherein the annular sealing member is housed within the sleeve.

15. The quick-connect coupling of claim 13, further comprising another annular sealing member positioned in a groove in the outer surface of the sleeve and configured to sealingly engage the inner wall of the bore.

* * * * *